United States Patent [19]

Gorney et al.

[11] Patent Number: 5,232,245
[45] Date of Patent: Aug. 3, 1993

[54] SPRING CLIP FOR PASSIVE SEAT BELT SYSTEM

[75] Inventors: Sanford J. Gorney, Romeo; Greg A. Wysocki, Sterling Heights, both of Mich.

[73] Assignee: TRW Vehicle Safety Systems Inc., Lyndhurst, Ohio

[21] Appl. No.: 794,444

[22] Filed: Nov. 19, 1991

[51] Int. Cl.⁵ .............................................. B60R 22/06
[52] U.S. Cl. ..................................... 280/804; 403/377
[58] Field of Search ............... 280/804, 802, 803, 801, 280/808; 297/469; 403/108, 109, 377

[56] References Cited

U.S. PATENT DOCUMENTS

| 4,106,311 | 8/1978 | Euler | 403/377 |
| 4,411,449 | 10/1983 | Takada | 280/804 |
| 4,618,164 | 10/1986 | Ryu | 280/804 |
| 4,635,964 | 1/1987 | Ryu | 280/804 |
| 4,671,537 | 6/1987 | Yoshitsugu | 280/804 |
| 4,750,758 | 6/1988 | Yamamoto | 280/804 |
| 4,752,163 | 6/1988 | Fedor | 403/377 |
| 4,763,750 | 8/1988 | Yoshitsugu | 280/804 |
| 4,878,692 | 1/1989 | Ando et al. | 280/804 |

Primary Examiner—Karin L. Tyson
Attorney, Agent, or Firm—Tarolli, Sundheim & Covell

[57] ABSTRACT

A passive seat belt system for restraining a vehicle occupant comprises a movable slider member connected to a seat belt, an elongate track along which the slider member moves, and a limit switch mechanism which cooperates with the slider member to stop movement of the slider member. A bracket supports the limit switch mechanism in the vehicle. A spring clip releasably locks the bracket to the track.

10 Claims, 4 Drawing Sheets

SPRING CLIP FOR PASSIVE SEAT BELT SYSTEM

FIELD OF THE INVENTION

The present invention relates to a passive seat belt system for restraining an occupant of a vehicle.

BACKGROUND OF THE INVENTION

U.S. Pat. No. 4,635,964 discloses a passive seat belt system for restraining an occupant of a vehicle. The passive seat belt system disclosed in the '964 patent includes a seat belt and an elongate track. The seat belt is anchored to a slider which is moved back and forth along the length of the track by a motor. When the motor moves the slider to the rearward end of the track, the slider carries the seat belt to a rearward position in which the seat belt extends across the torso of a vehicle occupant. When the motor moves the slider to the forward end of the track, the slider carries the seat belt to a forward position spaced from the vehicle occupant.

The passive seat belt system disclosed in the '964 patent also includes forward and rearward limit switches. The forward limit switch stops the motor when the slider reaches the forward end of the track, and the rearward limit switch stops the motor when the slider reaches the rearward end of the track. The forward limit switch is supported at the forward end of the track by a bracket. The forward limit switch is connected to the bracket by bolts, and the bracket is connected to both the track and the vehicle body by bolts. Another bracket associated with the rearward limit switch is also connected to the vehicle body by bolts.

SUMMARY OF THE INVENTION

In accordance with the present invention, an apparatus for restraining a vehicle occupant comprises a movable slider member connectable to a seat belt, an elongate track along which the slider member is movable, and a mechanism which cooperates with the slider member. A bracket supports the mechanism in the vehicle. The apparatus further comprises a spring clip for securing the bracket to the track.

In a preferred embodiment of the invention, the spring clip releasably locks the bracket to the track. The spring clip has a locked position engaging the bracket and the track, and blocks movement of the bracket relative to the track when in the locked position. The spring clip has a first portion for engaging the bracket and a second portion for engaging the track. The first and second portions of the spring clip are movable relative to each other against the bias of the spring clip.

An apparatus constructed in accordance with the invention enables the bracket to be connected to the track with a structure that is simplified in comparison with the bolts used in the prior art. The spring clip can connect the bracket to the track at a location where limited space does not permit the use of bolts or screws. The spring clip also allows quick and easy attachment and detachment of the bracket and the track, because the spring clip can be snapped into and out of its locked position by moving the first and second portions of the spring clip against the bias of the spring clip.

BRIEF DESCRIPTION OF THE DRAWINGS

The foregoing and other features of the invention will become apparent to those skilled in the art upon reading the following description of preferred embodiments of the invention with reference to the accompanying drawings wherein.

DESCRIPTION OF PREFERRED EMBODIMENTS

Figure 1:
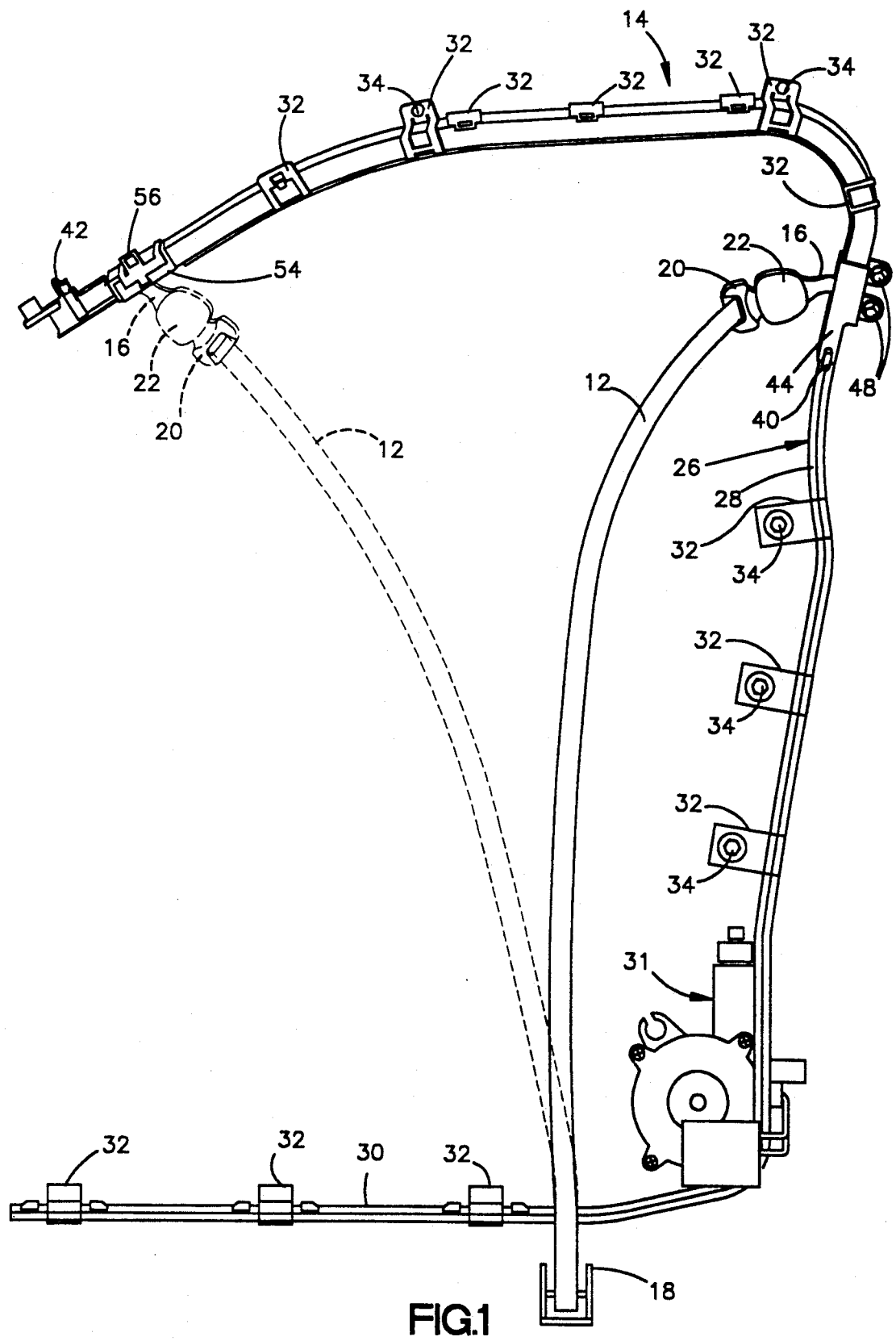
FIG. 1 is a partial view of a passive seat belt system constructed in accordance with the present invention.

As shown in FIG. 1, a passive seat belt system 10 constructed in accordance with the present invention includes a seat belt 12, an elongate track 14, and a slider 16 which is movable along the length of the track 14. The seat belt 12 extends between a retractor 18 (shown schematically) and a tongue 20. The tongue 20 is releasably locked in a buckle 22 which is fixed to the slider 16 to move with the slider 16 along the length of the track 14.

The passive seat belt system 10 also includes an elongate tape guide 26 having upper and lower sections 28 and 30. The tape guide 26 contains a drive tape (not shown) which is moved through the tape guide 26 and the track 14 by a motor 31. The slider 16 is connected to the drive tape to move with the drive tape, and is thus connected to the motor 31 to be moved by the motor 31. The tape guide 26 and the track 14 are connected to the vehicle by clips 32 which are fixed to the vehicle by bolts 34.

The motor 31 moves the slider 16 back and forth along the length of the track 14 between a rearward position shown in solid lines and a forward position shown in dashed lines. The motor 31 thus moves the seat belt 12 back and forth between a restraining position, shown in solid lines, and an open position, shown in dashed lines. When in the restraining position, the seat belt 12 extends across the torso of a vehicle occupant to restrain the vehicle occupant. When in the open position, the seat belt 12 is spaced forward of the vehicle occupant sufficiently to permit the vehicle occupant to enter and exit the vehicle.

The passive seat belt system 10 further includes a pair of limit switches 40 and 42. One limit switch 40 is located at the rearward end portion of the track 14. A bracket 44 supports the limit switch 40 at the rearward end portion of the track 14. The bracket 44 is connected to the track 14 by a spring clip 46 (FIG. 2), and is fixed to the vehicle by bolts 48. When the slider 16 moves into contact with the limit switch 40, the limit switch 40 operates in a known manner to stop the motor 31 from urging the slider 16 to continue moving in the rearward direction.

The other limit switch 42 is located at the forward end portion of the track 14. Another bracket 54 supports the limit switch 42 at the forward end portion of the track 14. The bracket 54 is connected to the track 14 by a spring clip 56 which is fixed to the vehicle by a bolt (not shown). When the slider 16 moves into contact with the limit switch 42, the limit switch 42 operates in a known manner to stop the motor 31 from urging the slider 16 to continue moving in the forward direction.

Figure 2:
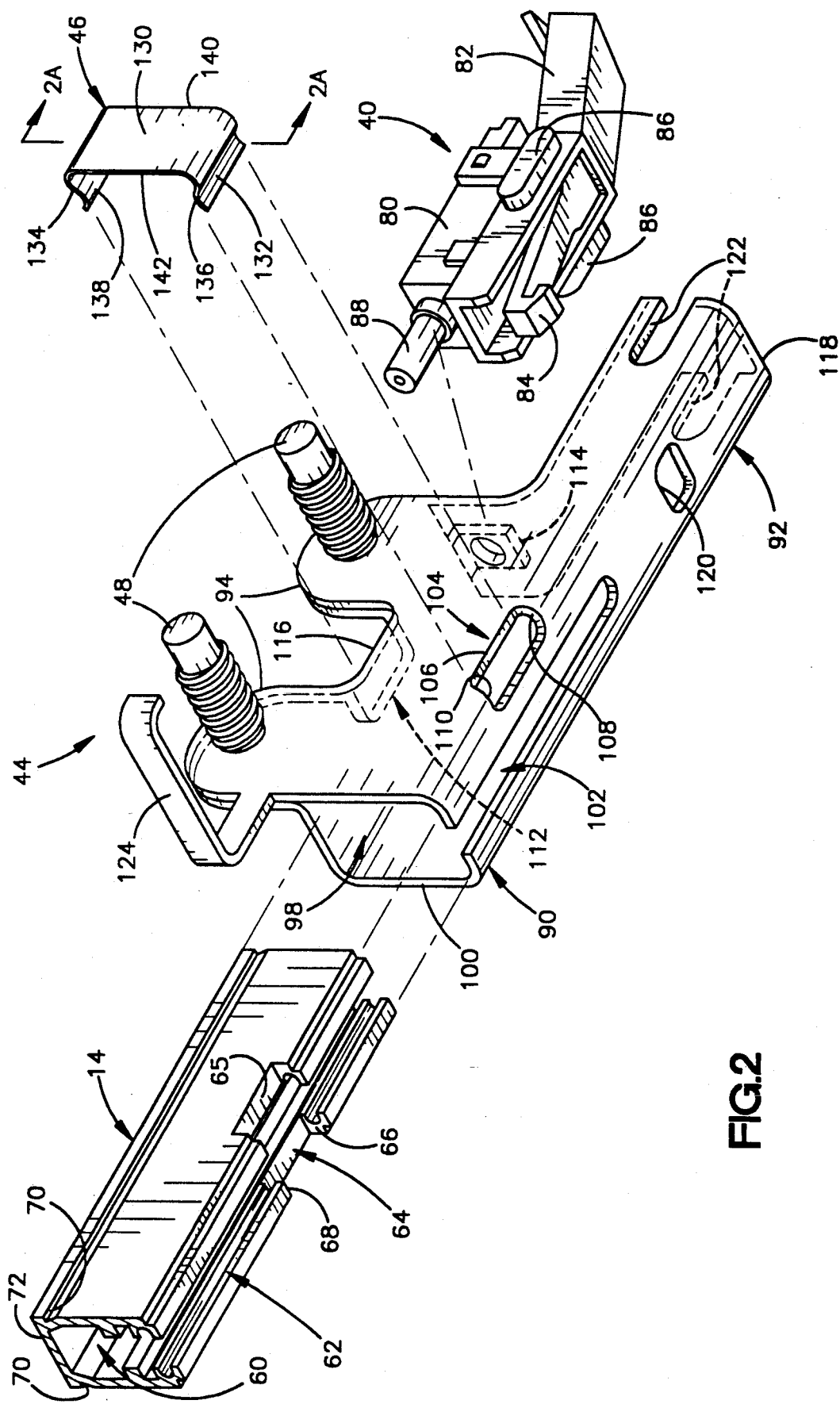
FIG. 2 is an enlarged, exploded view of parts of the system of FIG. 1.

The rearward end portion of the track 14 is shown in greater detail in FIG. 2. As shown in FIG. 2, the track 14 is generally rectangular in section and has a longitudinally extending internal passage 60 in which the slider 16 (FIG. 1) moves along the length of the track 14. The track 14 also has an elongate opening 62 which is formed in one side of the track 14 and is generally coextensive with the passage 60. The portion of the slider 16 which is shown in FIG. 1 extends outwardly from the passage 60 through the elongate opening 62. A rectangular notch 64 is formed in the side of the track 14 where the elongate opening 62 is located. The notch 64 is defined by a longitudinally extending base surface 65 and a pair of parallel abutment surfaces 66 and 68. The abutment surfaces 66 and 68 extend transversely of the base surface 65, and face in opposite directions along the length of the track 14. A pair of exterior grooves 70 extend along the length of the track 14 at locations adjacent to the corners of the track 14 which are remote from the elongate opening 62. The track 14 also has a flat outer surface 72 on the side of the track 14 opposite the elongate opening 62.

The limit switch 40 and the bracket 44 are also shown in greater detail in FIG. 2. The limit switch 40 includes a plunger housing 80 supported on a body part 82. The body part 82 has a resilient hook portion 84 and a pair of rigid projections 86. A cylindrical plunger 88 is movable into the plunger housing 80 against the bias of a spring in the plunger housing 80. The limit switch 40 also includes parts which respond to inward movement of the plunger 88. Those parts provide an electric signal for the motor 31 (FIG. 1) in a known manner. Such parts of a limit switch are known in the art, and therefore are not shown or described in detail.

The bracket 44 has a main portion 90, a channel-shaped portion 92, and a pair of mounting portions 94. The main portion 90 is generally rectangular in shape and hollow. It defines a rectangular inner passage 98, an open end 100, and a slot 102 extending from the open end 100. Another slot 104 at a corner of the main portion 90 has an edge 106 and opposite end surfaces 108 and 110. The end surfaces 108 and 110 in the slot 104 are spaced from each other a distance approximately equal to the distance between the opposed abutment surfaces 66 and 68 in the notch 64 in the track 14.

The main portion 90 of the bracket 44 also has an opening 112 and a plunger guide 114. The opening 112 is located on a side of the bracket 44 opposite the side having the slot 102, and is adjacent to an edge 116 of the bracket 44. The plunger guide 114 is located opposite the open end 100 of the passage 98.

The channel-shaped portion 92 of the bracket 44 extends from the end of the main portion 90 adjacent the plunger guide 114. The channel-shaped portion 92 has an open end 118 opposite the main portion 90, an aperture 120 intermediate its length, and a pair of opposed slots 122 extending from the open end 118. The mounting portions 94 of the bracket 44 project from the same side of the main portion 90 but are disposed on opposite sides of the opening 112. Apertures (not shown) are formed in the mounting portions 94 and receive the bolts 48 which fix the bracket 44 to the vehicle. One of the mounting portions 94 has a mounting arm 124 for engaging a portion of the vehicle.

Figure 2A:
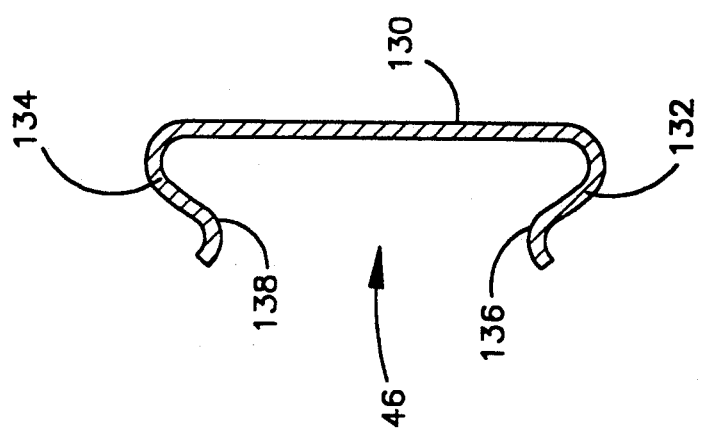
FIG. 2A is a view taken on line 2A—2A of FIG. 2.

Also shown in FIG. 2 is the spring clip 46 which connects the bracket 44 to the track 14. As shown in FIGS. 2 and 2A, the spring clip 46 is generally U-shaped with a flat rectangular base portion 130 and a pair of S-shaped spring arms 132 and 134. The spring arms 132 and 134 extend from opposite ends of the base portion 130 in the same direction away from the base portion 130. The spring arms 132 and 134 have clamping surfaces 136 and 138 which face each other across the space between the spring arms 132 and 134. The spring clip 44 also has opposite edge surfaces 140 and 142 extending along the length of the base portion 130 and the spring arms 132 and 134.

The spring clip 46 has an unstressed condition wherein the spring arms 132 and 134 and the clamping surfaces 136 and 138 are spaced from each other as shown in FIGS. 2 and 2A. The spring arms 132 and 134 are movable away from each other against the bias of the spring clip 46 to enlarge the space between the clamping surfaces 136 and 138. When the spring arms 132 and 134 are thus moved away from each other, the bias of the spring clip 46 urges the spring arms 132 and 134 to move back to the unstressed positions shown in FIGS. 2 and 2A.

As indicated by the dashed lines in FIG. 2, the track 14 and the limit switch 40 are assembled into the bracket 44. The rearward end portion of the track 14 is movable into the passage 98 in the bracket 44 through the open end 100. The track 14 and the passage 98 in the bracket 44 have complementary rectangular shapes so that the track 14 will slide into the passage 98 in a close fit. When the track 14 is received in the passage 98, the elongate opening 62 in the track 14 is aligned with the slot 102 in the bracket 44. The slider 16 (FIG. 1) can then extend outwardly from the passage 60 in the track 14 through both the elongate opening 62 and the slot 102 when the slider 16 reaches the rearward end of the track 14. The track 14 is moved into an assembled position in the passage 98 wherein the notch 64 on the track 14 is aligned with the corner slot 104 in the bracket 44. When the track 14 is in its assembled position, a portion of the outer surface 72 of the track is exposed through the opening 112 in the bracket 44.

The limit switch 40 is moved into an assembled position in the bracket 44 wherein the body part 82 of the limit switch 40 is received in the channel-shaped portion 92 of the bracket 44. The resilient hook portion 84 of the body part 82 snaps into the aperture 120, and the rigid projections 86 on the body part 82 fit into the slots 122. The resilient hook portion 84 and the projections 86 thus establish a releasable mechanical interlock between the limit switch 40 and the bracket 44. When the limit switch 40 is in its assembled position in the bracket 44, the plunger 88 extends through an opening in the plunger guide 114 on the bracket 44. The plunger 88 then reaches into the path of movement of the slider 16 (FIG. 1). When the slider 16 is moved to the rearward end of the track 14 by the motor 31, it pushes the plunger 88 into the plunger housing 80. The limit switch 40 then causes the motor 31 to stop urging the slider 16 to continue moving in the rearward direction.

The spring clip 46 is movable into engagement with the bracket 44 and the track 14 to lock the bracket 44 releasably to the track 14. After the track 14 is inserted into its assembled position in the bracket 44 as described above, the spring clip 46 is mounted on the bracket 44 as indicated by the dashed lines in FIG. 2. The spring clip 46 is moved into a locked position wherein the first spring arm 132 extends through the corner slot 104 and into the notch 64, and wherein the second spring arm 134 extends into the opening 112 over the outer surface 72 of the track 14. Specifically, the spring arms 132 and 134 are moved away from each other against the bias of the spring clip 46 to enlarge the space between the clamping surfaces 136 and 138. When that space is made greater than the distance between the edges 106 and 116 on the bracket 44, the clamping surfaces 136 and 138 can be moved past the edges 106 and 116 and into the corner slot 104 and the opening 112, respectively. The spring clip 46 then snaps into its locked position as the clamping surfaces 136 and 138 move under the bias of the spring clip 46 back toward each other, and toward the base surface 65 and the outer surface 72 on the track, respectively. The portion of the track 14 between the base surface 65 and the outer surface 72 is then captured between the spring arms 132 and 134. The portion of the bracket 44 between the edges 106 and 116 is also captured between the spring arms 132 and 134. Preferably, the spring clip 46 is unstressed when in the locked position.

When the spring clip 46 is in the locked position, the opposite edge surfaces 140 and 142 on the spring clip 46 block movement of the abutment surfaces 66 and 68 on the track, and thus hold the track 14 from moving longitudinally out of its assembled position in the bracket 44. Preferably, the opposite edge surfaces 140 and 142 simultaneously engage the abutment surfaces 66 and 68 in the notch 64 and the end surfaces 108 and 110 in the corner slot 104 to hold the track 14 and the bracket 44 together tightly. The spring arms 132 and 134 also preferably contact the edges 106 and 116 on the bracket 44 and the surfaces 72 and 65 on the track 14 firmly to hold the spring clip 46 tightly in engagement with both the bracket 44 and the track 14. The spring clip 46 can easily be removed from its locked position by moving the spring arms 132 and 134 back out of their locked positions against the bias of the spring clip 46.

Figure 3A:
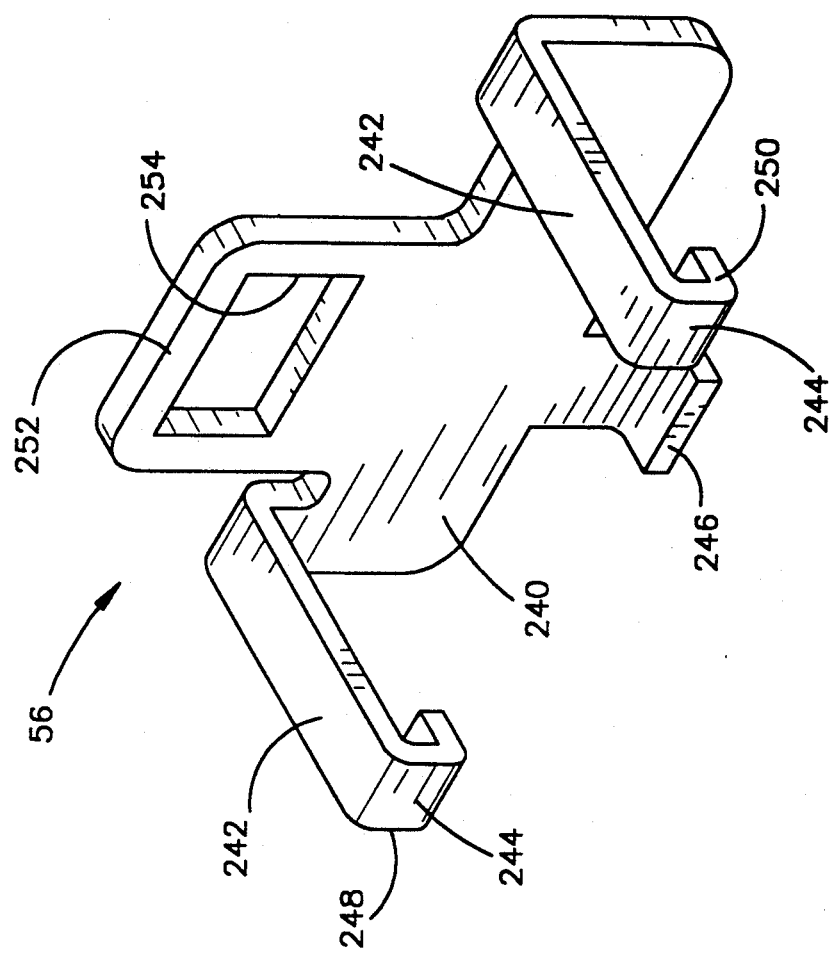
FIG. 3A is a view of a part shown in FIG. 3.
Figure 3:
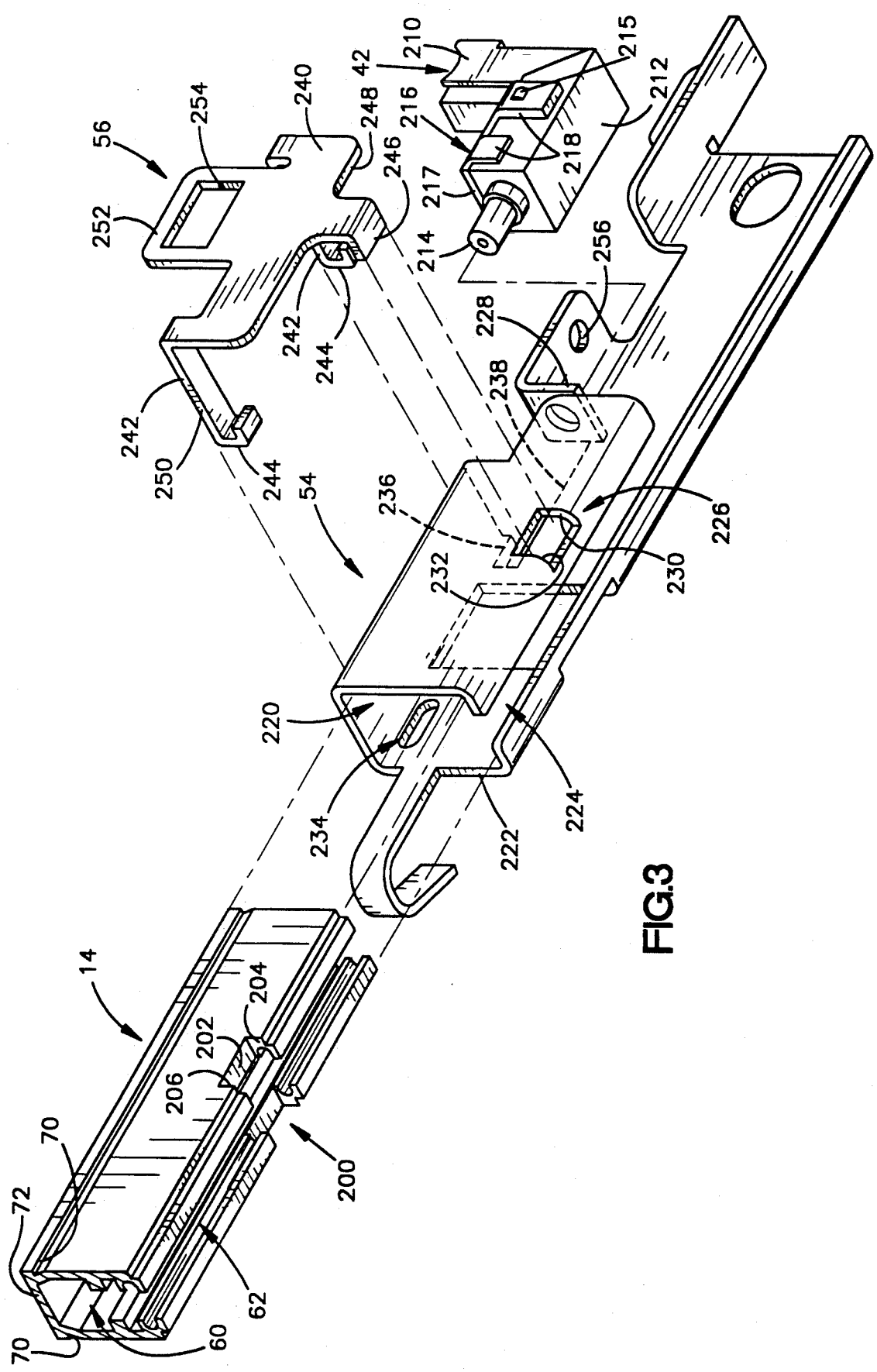
FIG. 3 is an enlarged exploded view of other parts of the system of FIG. 1.

The limit switch 42 and the bracket 54 at the forward end portion of the track 14 are shown in detail in FIG. 3. The forward end portion of the track 14 has a rectangular notch 200 formed in the side of the track 14 in which the elongate opening 62 is formed. The notch 200 is defined by a longitudinally extending base surface 202 and a pair of parallel abutment surfaces 204 and 206. Like the abutment surfaces 66 and 68 in the notch 64 at the rearward end portion of the track 14, the abutment surfaces 204 and 206 extend transversely of the base surface 202 and face in opposite directions along the length of the track 14.

The limit switch 42 includes a body part 210 and a plunger housing 212 with a plunger 214. A pair of hooks 215, one of which is shown in FIG. 3, are located on opposite sides of the plunger housing 212. A switch bracket 216 is mounted on the plunger housing 212. The switch bracket 216 has a base portion 217 and two pairs of mounting arms 218. The base portion 217 has a rivet opening (not shown) located over the top of the plunger housing 212. One pair of mounting arms 218 extends downward from the base portion 217 on the side of the plunger housing 212 shown in FIG. 3. The other pair of mounting arms 218 extends downward from the base portion 217 on the opposite side of the plunger housing 212, which is not shown in FIG. 3. The hook 215 on one side of the plunger housing 212 extends through an aperture in one of the mounting arms 218, and the hook 215 on the other side of the plunger housing 212 extends through an aperture in another one of the mounting arms 218. The hooks 215 thus connect the limit switch 42 to the switch bracket 216. The limit switch 42 also has other parts which are known in the art and are not shown in the drawings.

Like the bracket 44, the bracket 54 has a passage 220 and an open end 222 for receiving the track 14. The bracket 54 also has a slot 224 for the slider 16, a corner slot 226 and a plunger guide 228. The corner slot 226 has opposite end surfaces 230 and 232 which are spaced from each other a distance approximately equal to the distance between the abutment surfaces 204 and 206 in the notch 200 in the track 14. The bracket 54 further has a slot 234 and a notch 236 which are each located adjacent to the corner of the bracket 54 opposite the corner where the corner slot 226 is located. An upper edge 238 extends from the notch 236 as shown in FIG. 3.

Also shown in FIG. 3 is the spring clip 56 which connects the bracket 54 to the track 14. As shown in FIGS. 3 and 3A, the spring clip 56 has a flat, rectangular base portion 240. Two upper spring arms 242 having hook-shaped end portions 244 extend from the top of the base portion 240 in the same direction away from the base portion 240. A lower spring arm 246, which is shorter than the upper spring arms 242, extends from the bottom of the base portion 240 in the same direction away from the base portion 240 as the upper spring arms 242. The spring arms 242 and 246 are each movable relative to the other against the bias of the spring clip 56 to enlarge the space between the lower spring arm 246 and the upper spring arms 242. The spring clip 56 also has opposite edge surfaces 248 and 250. A flat, rectangular mounting portion 252 extends from the base portion 240 between, but transversely of, the upper spring arms 242. The mounting portion 252 has an opening 254 through which a bolt or other fastener is receivable to connect the spring clip 56 to the vehicle.

As indicated by the dashed lines in FIG. 3, the track 14 and the limit switch 42 are assembled into the bracket 54. The forward end portion of the track 14 is slidable into the passage 220 in the bracket 54 through the open end 222. When the track 14 is received in the passage 220, the elongate opening 62 is aligned with the slot 224, and one of the external grooves 70 is aligned with the slot 234. The track 14 is moved into an assembled position in the passage 220 wherein the notch 200 on the track 14 is aligned with the corner slot 226 in the bracket 54. When the track 14 is in its assembled position, the associated external groove 70 extends past the notch 236 and adjacent to the edge 238 on the bracket 54.

The limit switch 42 is moved into an assembled position in the bracket 54 wherein the plunger housing 212 and the switch bracket 216 are located beneath a rivet opening 256 in the bracket 54, as shown in FIG. 3. A rivet (not shown) is fastened through the rivet opening in the base portion 217 of the switch bracket 216 and through the rivet opening 256 in the bracket 54. The rivet fixes the switch bracket 216 to the bracket 54. The limit switch 42, which is connected to the switch bracket 216, is thus connected to the bracket 54. When the limit switch 42 is in its assembled position, the plunger 214 extends through the opening in the plunger guide 228 and into the passage 220. The plunger 214 is thus positioned to be moved into the plunger housing 212 by the slider 16 (FIG. 1) when the slider 16 is moved to the forward end of the track 14 by the motor 31. The limit switch 42 operates in a known manner to stop the motor 31 from urging the slider 16 to continue moving in the forward direction when the plunger 214 is pushed into the plunger housing 212 by the slider 16.

The spring clip 56 is movable into engagement with the bracket 54 and the track 14 to lock the bracket 54 releasably to the track 14. After the track 14 is moved into its assembled position in the bracket 54 as described above, the spring clip 56 is mounted onto the bracket 54 as indicated by the dashed lines in FIG. 3. The spring clip 56 is first placed loosely on the bracket 54 in an unstressed, unlocked position wherein the lower spring arm 246 extends into the corner notch 226. The upper spring arms 242 extend toward the opposite corner of the bracket 54 where the slot 234 and the notch 236 are located. The spring clip 56 is then snapped into a locked position wherein the hook-shaped end portions 244 of the upper spring arms 242 extend into the groove 70 through the slot 234 and the notch 236. When the spring clip 56 snaps into position, the upper and lower spring arms 242 and 246 first move away from each other against the bias of the spring clip 56, and then move back toward each other under the bias of the spring clip 56. Preferably, the spring clip 56 fully returns to an unstressed condition when it snaps into the locked position.

When the spring clip 56 is in the locked position, it blocks longitudinal movement of the track 14 relative to the bracket 54 because the lower spring arm 246 blocks movement of the abutment surfaces 204 and 206 past the corner slot 226 in the bracket 54. Preferably, the edge surfaces 248 and 250 on the spring clip 56 simultaneously abut all the adjoining surfaces in the slots and notches into which they extend so that the spring clip 56 holds the bracket 54 and the track 14 together tightly. Also, the hook-shaped end portions 244 of the upper spring arms 242 preferably contact the surface of the track 14 in the groove 70 firmly to hold the spring clip 56 tightly in engagement with both the track 14 and the bracket 54. The spring clip 56 can easily be removed from its locked position by moving the spring arms 242 and 246 back out of their locked positions against the bias of the spring clip 56 to move them out of the notch 236 and the slots 234 and 226 in the bracket 54.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for restraining a vehicle occupant, said apparatus comprising:
   a movable slider member connectable to a seat belt;
   an elongate track along which said slider member is movable;
   a mechanism which cooperates with said slider member;
   a bracket having surface means for supporting said mechanism; and
   locking means for locking said bracket to said track, said locking means comprising a spring clip having a locked position engaging said bracket and said track, said spring clip precluding movement of said bracket relative to said track when in said locked position.

2. An apparatus as defined in claim 1 wherein said spring clip is unstressed when in said locked position.

3. An apparatus as defined in claim 1 wherein said spring clip has a first portion engaging said bracket when said spring clip is in said locked position, and a second portion engaging said track when said spring clip is in said locked position, said first and second portions being movable relative to each other against the bias of said spring clip.

4. An apparatus as defined in claim 3 wherein said first and second portions of said spring clip each engage both said bracket and said track when said spring clip is in said locked position.

5. An apparatus as defined in claim 1 wherein said mechanism which cooperates with said slider member is a limit switch mechanism.

6. An apparatus for restraining a vehicle occupant, said apparatus comprising:
   a movable slider member connectable to a seat belt;
   an elongate track having a longitudinal passage in which said slider member is movable, said track having an abutment surface facing in a direction extending longitudinally along said track;
   a mechanism which cooperates with said slider member;
   supporting means for supporting said mechanism, said supporting means comprising a bracket having an abutment surface facing in a direction extending longitudinally along said track; and
   locking means for locking said bracket to said track, said locking means comprising a spring clip having locking surface means for abutting said abutment surfaces on said track and said bracket to preclude longitudinal movement of said track relative to said bracket.

7. An apparatus as defined in claim 6 wherein said locking surface means includes first and second abutment surfaces on said spring clip, said first abutment surface on said spring clip facing said abutment surface on said track and having a position abutting said abutment surface on said track, said second abutment surface on said spring clip facing said abutment surface on said bracket and having a position abutting said abutment surface on said bracket.

8. An apparatus as defined in claim 7 wherein said spring clip has a locked position in which said first abutment surface on said spring clip abuts said abutment surface on said track and said second abutment surface on said spring clip simultaneously abuts said abutment surface on said bracket.

9. An apparatus as defined in claim 7 wherein said spring clip has first and second spring arms movable relative to each other against the bias of said spring clip, said first and second abutment surfaces on said spring clip being located on said first spring arm.

10. An apparatus as defined in claim 6 wherein said abutment surface on said track is located in an opening extending into said track at a location between the ends of said track.

* * * * *